(12) United States Patent
Barcelo

(10) Patent No.: US 6,473,780 B1
(45) Date of Patent: *Oct. 29, 2002

(54) SCHEDULING OF DIRECT MEMORY ACCESS

(75) Inventor: Joseph S. Barcelo, Paterson, NJ (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 113 days.

(21) Appl. No.: 09/053,427

(22) Filed: Apr. 1, 1998

(51) Int. Cl.[7] .................................................. G06F 9/00
(52) U.S. Cl. ........................................ 709/103; 710/22
(58) Field of Search ................................ 709/100–107, 709/103; 710/58, 241, 22; 711/112

(56) References Cited

U.S. PATENT DOCUMENTS

| | | | | |
|---|---|---|---|---|
| 4,502,117 A | * | 2/1985 | Kihara ........................ 710/28 |
| 4,716,523 A | * | 12/1987 | Burrus, Jr. et al. ............ 710/28 |
| 4,773,000 A | * | 9/1988 | Nissen ........................ 710/28 |
| 4,811,306 A | * | 3/1989 | Boning et al. .............. 365/200 |
| 4,831,523 A | * | 5/1989 | Lewis et al. .................. 710/28 |
| 4,901,234 A | * | 2/1990 | Heath et al. .................. 710/40 |
| 5,119,487 A | * | 6/1992 | Taniai et al. .................. 710/22 |
| 5,212,795 A | * | 5/1993 | Hendry ........................ 710/28 |
| 5,241,661 A | * | 8/1993 | Concilio et al. .............. 710/40 |
| 5,247,671 A | * | 9/1993 | Adkins et al. ............... 709/103 |
| 5,293,388 A | * | 3/1994 | Monroe et al. .............. 714/752 |
| 5,301,287 A | * | 4/1994 | Herrell et al. ............... 711/202 |
| 5,333,274 A | * | 7/1994 | Amini et al. ................. 714/50 |
| 5,530,901 A | * | 6/1996 | Nitta ........................... 710/28 |
| 5,530,902 A | * | 6/1996 | McRoberts et al. ........... 710/28 |
| 5,535,417 A | * | 7/1996 | Baji et al. ...................... 710/22 |
| 5,634,076 A | * | 5/1997 | Garde et al. .................. 710/22 |
| 5,659,797 A | * | 8/1997 | Zandveld et al. ............. 710/22 |
| 5,668,815 A | * | 9/1997 | Gittinger et al. ............ 714/719 |
| 5,668,957 A | * | 9/1997 | Davis et al. ................ 710/129 |
| 5,680,401 A | * | 10/1997 | Gayton et al. ............... 370/474 |
| 5,765,024 A | * | 6/1998 | Riley .......................... 710/22 |
| 5,794,072 A | * | 8/1998 | Nomura et al. ............... 710/40 |
| 5,794,073 A | * | 8/1998 | Ramakrishnan et al. ...... 710/40 |
| 5,822,618 A | * | 10/1998 | Ecclesine ..................... 710/57 |
| 5,826,101 A | * | 10/1998 | Beck et al. .................. 712/34 |
| 5,838,993 A | * | 11/1998 | Riley et al. .................. 710/22 |
| 5,857,114 A | * | 1/1999 | Kim ........................... 710/22 |
| 5,875,351 A | * | 2/1999 | Riley .......................... 710/22 |
| 5,878,217 A | * | 3/1999 | Cherukuri ................... 709/212 |
| 5,884,050 A | * | 3/1999 | Wheeler et al. ............. 710/107 |
| 5,968,153 A | * | 10/1999 | Wheeler et al. ............. 710/110 |
| 5,974,479 A | * | 10/1999 | Satoh .......................... 710/25 |
| 6,081,852 A | * | 6/2000 | Baker .......................... 710/24 |
| 6,108,743 A | * | 8/2000 | Debs et al. ................. 710/240 |
| 6,128,676 A | * | 10/2000 | Ohkubo ....................... 710/28 |
| 6,192,428 B1 | * | 2/2001 | Abramson et al. ............ 710/52 |
| 6,230,219 B1 | * | 5/2001 | Fields, Jr. et al. ............. 710/22 |
| 6,298,397 B1 | * | 10/2001 | Maruyama ................... 710/25 |

OTHER PUBLICATIONS

Silberschatz et al. "Operating System Concepts", 1992, (pp. 97–128).*

* cited by examiner

Primary Examiner—St. John Courtenay, III
Assistant Examiner—Van H. Nguyen
(74) Attorney, Agent, or Firm—Kaplan & Gilman, LLP

(57) ABSTRACT

An improved microprocessor system includes an execution arbitrator which arbitrates between core CPU tasks and DMA tasks and allows for multiple priorities among each, and for priorities with respect to each other.

26 Claims, 3 Drawing Sheets

SCHEDULING OF DIRECT MEMORY ACCESS

This invention relates to microprocessor systems, and more specifically, to an improved technique of scheduling direct memory access ("DMA") in microprocessor systems.

BACKGROUND OF THE INVENTION

Direct memory access ("DMA") is a technique utilized in microprocessor systems and often employed in real time embedded digital signal processing systems. DMA involves the transfer of information from one portion of memory to another in an efficient manner without reading such information through the Central Processing Unit (CPU) of the main microprocessor system. The use of DMA channels facilitates fast transfer of large amounts of information between portions of system memory without occupying large amounts of CPU overhead. Typically, DMA transfer occurs at a predetermined static priority level with respect to the execution of application software programs within the DSP. The application programs, also called "core jobs", are typically given higher priority than the DMA jobs with respect to memory access.

Such prior art systems are sub-optimal because they fail to account for the fact that some DMA jobs may have higher priority than some core jobs. Additionally, the DMA jobs themselves may have different priorities with respect to each other and the priorities may be different from the chronological order in which the DMA jobs arrive. None of this is taken into account in present systems, and thus, there results an inability to use DMA channels to transfer data in hard real time systems without a degradation in system performance and reliability.

SUMMARY OF THE INVENTION

The above and other problems of the prior art are overcome in accordance with the present invention which relates to a technique of both individually prioritizing DMA jobs, as well as prioritizing DMA jobs with respect to core jobs. In this manner, DMA jobs may preempt lower priority DMA jobs and DMA jobs and core jobs may preempt each other. Such a system results in the highest priority task, be it core or DMA, being given access to memory at any given time.

In an enhanced embodiment, DMA priorities may be adjusted slightly higher or lower than a specific core job. Such core job could be, for example, the core job which spawned the DMA task. Such adjustment allows for the DMA job to run in the background while the core job which spawned the DMA job runs in the foreground or vice versa. Additionally, core jobs could be prioritized as 1, 3, 5, 7, etc., while DMA jobs are prioritized as 2, 4, 6, and 8. This provides a system where core jobs and DMA jobs may run in a foreground/background mode, either the core or the DMA job running in the foreground, and the other running in the background.

In another enhanced embodiment, a scheduler/arbitrator sequentially polls DMA job queues and core job queues, and executes jobs from each in accordance with a priority number assigned to the job. Each queue has its highest priority tasks at the top thereof, so that only a task with equal or higher priority from the other queue can preempt execution of such highest priority task.

DETAILED DESCRIPTION OF THE PREFERRED EMBODIMENT

Figure 1:
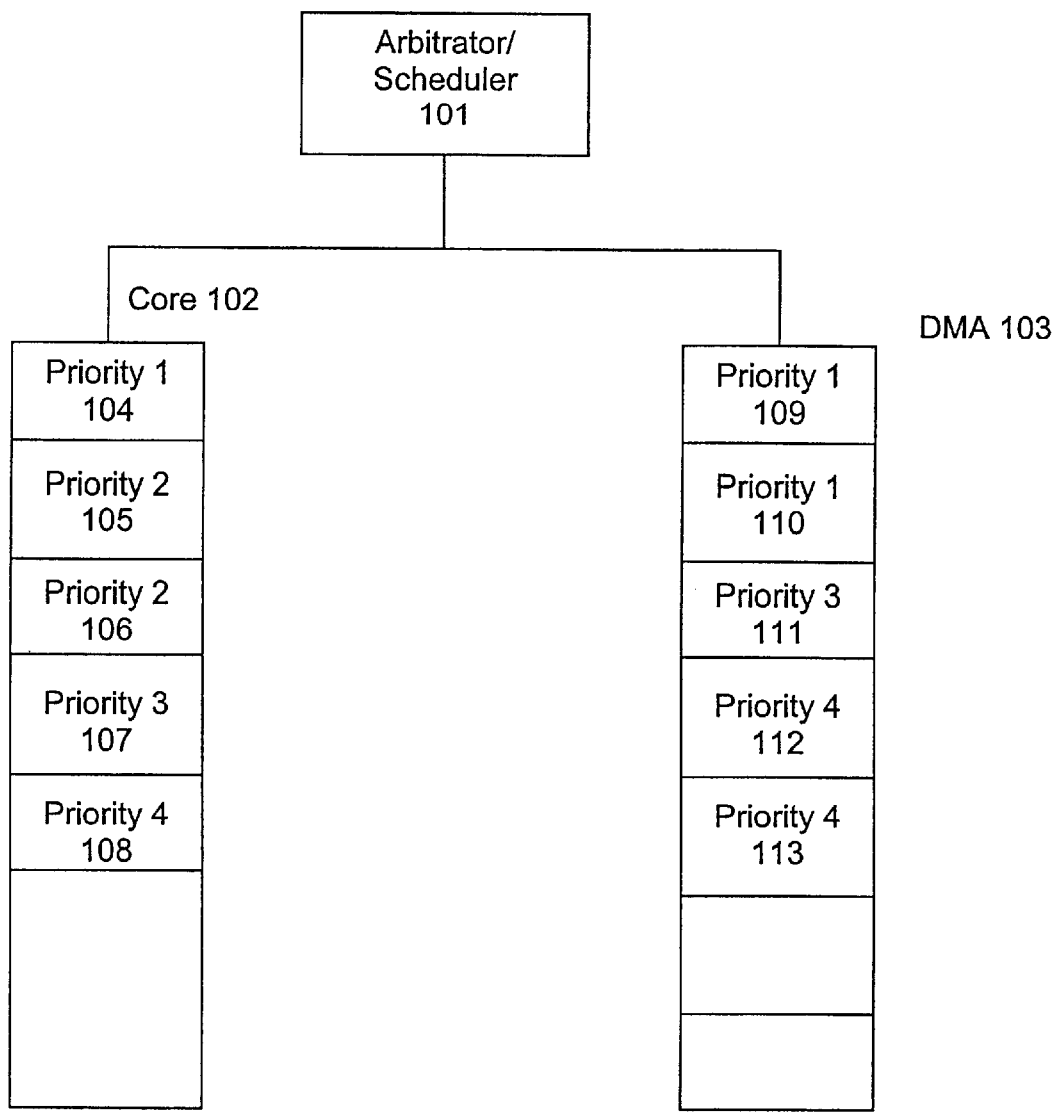
FIG. 1 shows a conceptual diagram representing the scheduling by the execution block of DMA jobs and core jobs.

FIG. 1 shows a representation of a scheduler block 101 which arbitrates between a queue of core jobs 102 and a queue of DMA jobs 103. As shown in FIG. 1, the jobs are ordered by priority within each queue. FIG. 1 is only intended to represent the concept embodied in operation of the system. The required software to implement such concept can be readily coded by those of skill in the art.

In operation, scheduler block 101 examines alternately the core queue 102 and DMA queue 103 prior to each execution cycle and selects the highest priority job from the two for execution. If, during any particular cycle, the highest priority core job has no need to access memory, then both the DMA job and the core job may execute. It is only if the highest priority core job needs memory access that it must compete with the DMA job. In the event the same priority is assigned the present task in core queue 102 and the present task in DMA queue 103, the system may have a static parameter which determines which of the two executes first. Usually a tie would result in a core job being executed.

Referring to FIG. 1, the scheduler 101 checks the core queue 102 first and then the DMA queue 103 and determines that both contain tasks at priority 1, the highest priority. In one preferred embodiment, when both queues contain tasks of equal priority, the core job is chosen to execute. In the absence of any change in the contents of either job queue, and specifically in the absence of newer higher priority jobs being placed into either of the queues 102 and 103, core job 104 is given access to memory on each cycle during which it requests such access until such time as it completes its processing. Upon completion of processing of core job 104, it is removed from the queue 102. At this time, DMA job 109 competes for access to memory with core job 105. Since DMA job 109 has a higher priority, it is given access to memory until such time as it completes its processing, and is then removed from the queue.

Upon completion of DMA job 109 processing, core job 105 now competes for access to memory with DMA job 110. As DMA job 110 has a higher priority then core job 105, the DMA job 110 is given access to memory on each cycle that it requests such access until completion or until preemption by the appearance of a higher priority job in either queue. The process continues as jobs arrive and are processed in each queue.

In another embodiment, the priorities assigned to the DMA tasks are offset by a number between zero and one half with respect to the priorities assigned to the core jobs. The offset may be added to or subtracted from the priority of the core job. This allows for the system to distinguish between foreground and background jobs. Specifically, consider the situation where the offset is chosen as ¼. A DMA task could have a priority of 2¼ while a core task would have a priority of 2. This would mean that the DMA task runs in the background and the core task would run in the foreground at a given time. Alternatively, if the offset were a negative, the DMA job would be given a priority of 1¾, and the core job would be given the priority of 2. This would mean the DMA job runs in the foreground while the core job runs in the background.

Since the DMA controller typically operates upon a cycle by cycle basis, DMA jobs and core jobs may preempt other DMA jobs and core jobs that are presently executing. Specifically, any particular DMA job or core job may require a large number of execution cycles to complete. In accordance with an additional enhanced embodiment, DMA jobs may be interrupted midstream by other DMA jobs or by other core jobs. For example, consider a DMA job which requires one hundred execution cycles. The scheduler can check the queues 102 and 103 after each execution cycle is used. If, after the fiftieth execution cycle and when the DMA job is thus half done, another job is present in the DMA queue 103 or the core queue 102 which has higher priority than the job being executed, the job being executed can be preempted. The preempted job can then be placed on the queue and its execution continued after the execution of the higher priority job that preempted it and any other higher priority jobs that arrive before the preempted job completes its execution.

Additionally, whether or not jobs may be preempted by other higher priority jobs may be determined based upon whether or not the preempting job is from the same queue or a different queue. For example, the scheduler may be programmed such that a higher priority core job may preempt a DMA job, but a higher priority DMA job may only preempt a lower priority DMA job. In such an example, if core queue 102 included a job with a priority higher than the highest priority job in DMA queue 103, then the core job would begin and could not be preempted by a higher priority DMA job arriving in DMA queue 103 during the execution of such core job.

Another embodiment involves allowing the priority of the DMA job to be set by the core job that generates such DMA job. Specifically, when a DMA job is placed into the DMA queue by the CPU, the CPU could include a tag which indicates priority. The tag can be calculated based upon a variety of factors such as those used to calculate the priority of core jobs in typical real time operating systems. Alternatively, DMA jobs could inherit the priority of the core job that actually requested the DMA job. DMA jobs could also inherent a priority which differs by a fixed amount from the priority of the core job that generated the DMA job. For example, the core job could automatically assign DMA jobs it generates a priority of one less than the core job generating the DMA job. Other possibilities for the assignment of DMA priorities exist as well.

Figure 2:
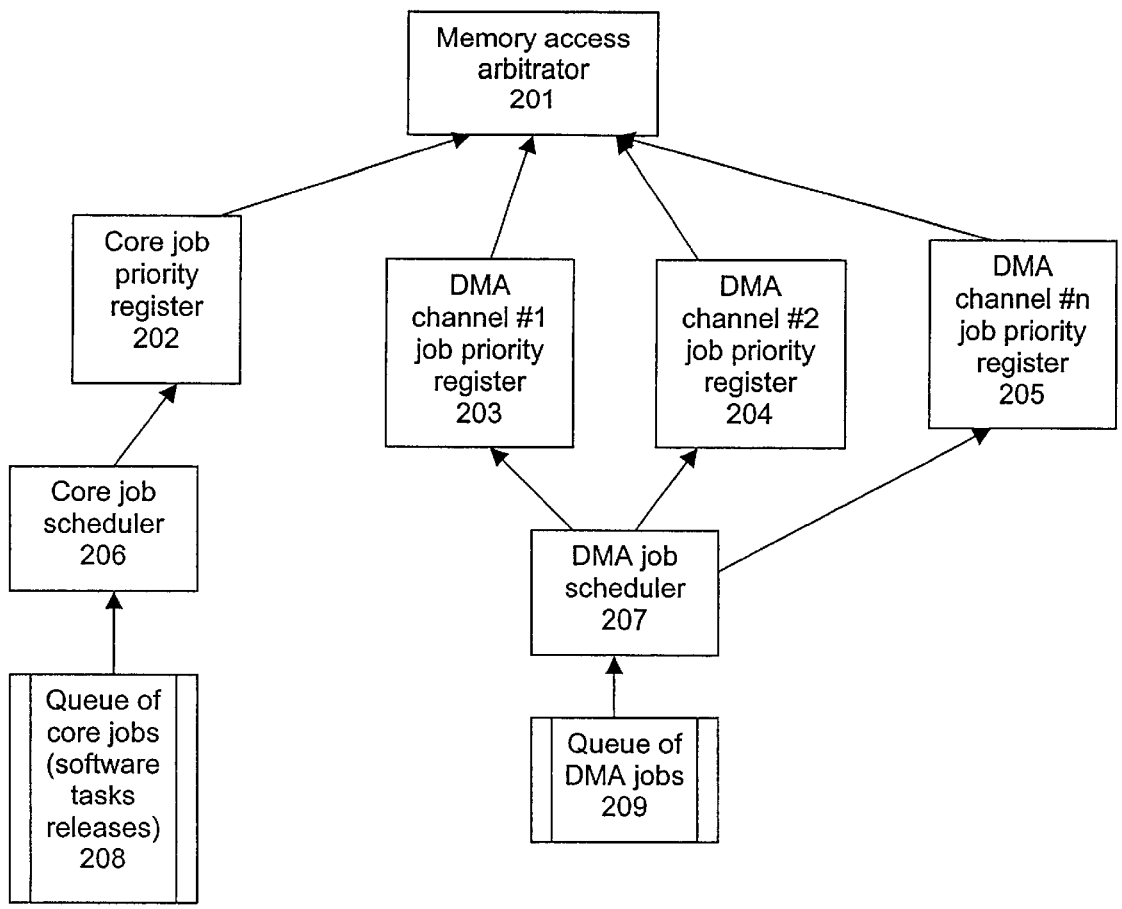
FIG. 2 shows a conceptual diagram of an alternative embodiment of the invention.

FIG. 2 shows an alternative exemplary embodiment of the present invention. The arrangement in FIG. 2 includes a memory access arbitrator 201 similar to scheduler 101. The arbitrator 201 arbitrates between a core job priority register 202 and plural DMA channel registers 203 through 205. As indicated in FIG. 2, other DMA channels are possible as well.

Queue 208 comprises the core jobs to be executed and queue 209 comprises the DMA jobs to be executed. The core queue 208 and DMA queue 209 each contain a scheduler 206 and 207, respectively. The scheduler is intended to place the highest priority task from the corresponding queue into the priority register 202 or 203 through 205.

In operation, memory access arbitrator checks each of the priority registers 202 through 205 on a cycle by cycle basis and allocates the memory access to the task with the highest priority. It is noted that at least one of the tasks present in registers 202 through 205 is usually executing, and most tasks require multiple clock cycles. Accordingly, since arbitrator 201 allocates memory access on a cycle by cycle basis, the system provides for preemption of executing tasks.

Figure 3:
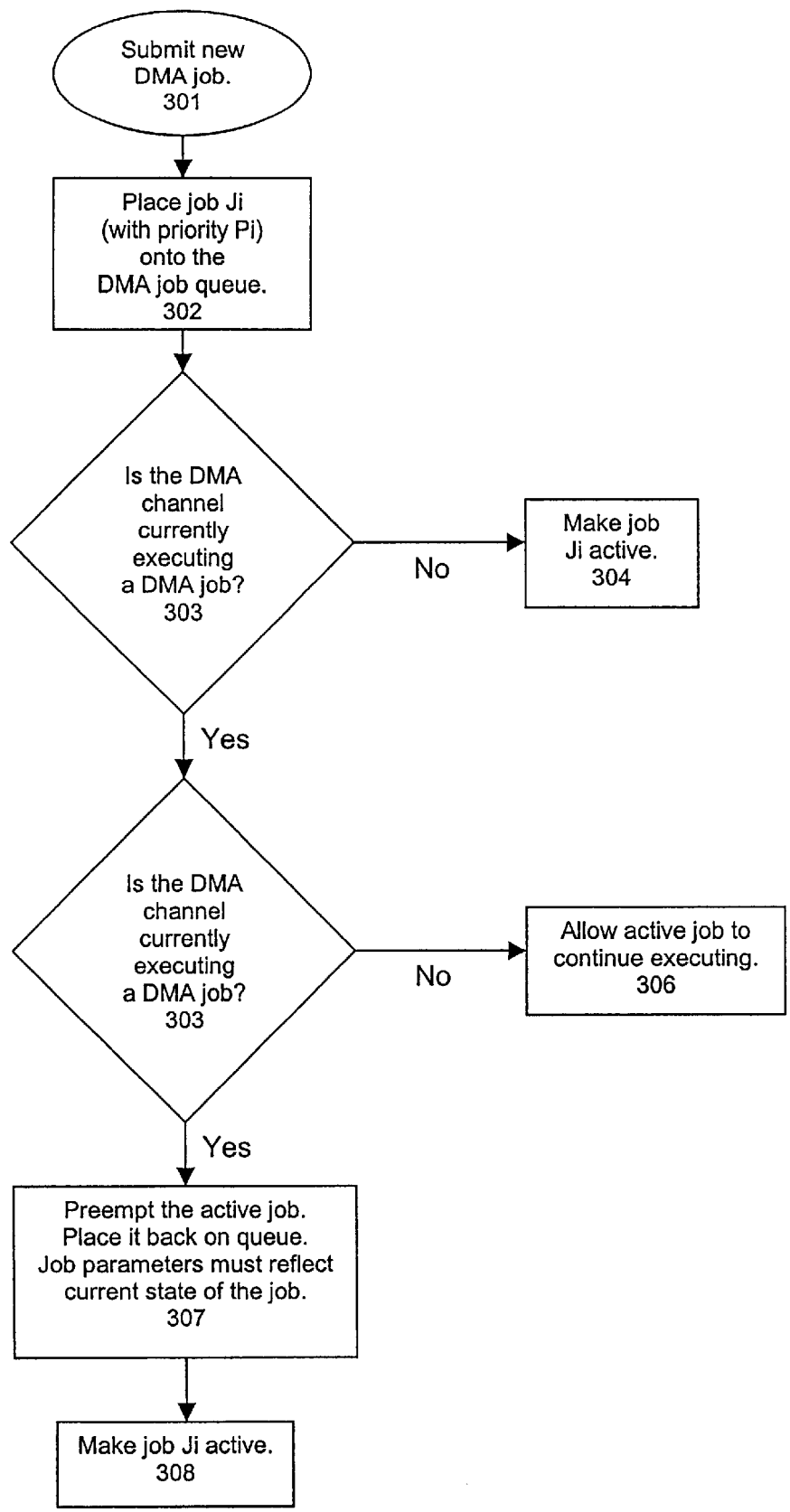
FIG. 3 shows a flow chart which may be used in implementing an exemplary method of the present invention.

FIG. 3 shows a flow chart of the steps necessary to implement an exemplary embodiment of the present invention. The steps shown in FIG. 3 are intended to implement the DMA portion of the system.

In operation, a new job is submitted at 301 and control is passed to operational block 302 where the job is placed into the DMA queue. Decision block 303 determines whether the DMA channel is currently executing a DMA job. If not, the recently received DMA job is made active. If however, the DMA channel is currently executing a different DMA job, then decision block 305 determines whether the presently executing DMA job has a lower priority than the recently received DMA job. If not, control is passed to block 306 where the presently executing DMA job continues to execute. Otherwise block 307 will preempt the active job and place it back on the queue while maintaining the state of any parameters associated with such job. Finally, the recently received DMA job will be made active instead. The preempted DMA job will not resume unless and until all jobs with higher priority have executed.

While the above describes the preferred embodiment of the invention, various other embodiments will be apparent to those of skill in the art. Such embodiments are intended to be covered by the claims appended hereto.

What is claimed is:

1. A method of operating a computer system having DMA tasks and core tasks, in which at least one of said DMA tasks is generated by one of said core tasks, said method comprising:

assigning a priority to each of said DMA tasks and core tasks wherein said at least one DMA tasks is assigned a priority that corresponds to a priority of said one core task that generated it; and executing a task of a highest priority irrespective of whether it is a DMA task or a core task.

2. The method of claim 1 further comprising a step of placing all of said DMA tasks in a DMA task queue and all of said core tasks in a core task queue, and a step of interrogating highest priorities in both of said queues before allocating use of a cycle to determine which queue has a currently highest priority task to be executed, and executing said task.

3. The method of claim 2 wherein said step of assigning comprising the step of, each time a new task is placed into one of said two queues, prioritizing said tasks in said one queue in which said new task is placed.

4. The method of claim 3 wherein said new task is a DMA task and said one queue is said DMA task queue.

5. The method of claim 3 wherein said new task is a core task and said one queue is said core task queue.

6. The method of claim 3 wherein said core task queue and said DMA task queue each include a scheduling module, and a priority is allocated to said new task by said scheduling module in said one queue.

7. The method of claim 1 wherein said step of assigning includes the steps of assigning said DMA tasks to run in a foreground mode and said core tasks to run in a background mode, or vise versa, as desired.

8. The method of claim 1 wherein at least one of said DMA tasks has a priority higher than that of at least one of said core tasks.

9. The method of claim 1 wherein said priority of said at least one DMA task is offset to said priority of said one core task that generated it by a predetermined amount.

10. The method of claim 9 wherein said priority of said one core task is an integer.

11. The method of claim 10 wherein said predetermined amount is a value between 0 and 0.5.

12. The method of claim 10 wherein said predetermined amount is a value between 0 and −0.5.

13. The method of claim 7 wherein said priorities of DMA tasks are all in odd integers and said priorities of core tasks are all in even integers, or vice versa.

14. The method of claim 8 wherein said step of executing comprises the steps of preempting a task that is presently executing and executing a task of said currently highest priority.

15. The method of claim 14 wherein, if said task of said currently highest priority is a DMA task, said step of preempting is carried out only if said task that is presently executing is also a DMA task of a priority lower than said currently highest priority.

16. The method of claim 2 wherein said step of executing comprising executing a core task when a highest priority in said core queue is equal to a highest priority in said DMA queue.

17. Apparatus for managing a computer system having DMA tasks and core tasks to be executed, in which at least one of said DMA tasks is generated by one of said core tasks, said apparatus comprising:

means for placing all of said DMA tasks in a DMA task queue and all of said core tasks in a core task queue;

means for assigning a priority to each of said DMA tasks and core tasks wherein said at least one DMA tasks is assigned a priority that corresponds to a priority of said one core task that generated it; and means for arbitrating between said DMA task queue and said core task queue to determine whether a DMA task or a core task gets executed during any given cycle because of having a highest priority among all of said tasks in both said queues.

18. The apparatus of claim 17 wherein said means for arbitrating includes means for selecting a task of highest priority to be executed irrespective of whether such task is a DMA task or a core task.

19. The apparatus of claim 18 further comprising a core scheduler for placing a core task in said core task queue, and a DMA scheduler for placing a DMA task in said DMA task queue, each of said queues being ordered to place a task with a highest priority in line to compete for an execution cycle with a task of highest priority form the other of said queues.

20. A computer system having DMA tasks and core tasks to be executed, comprising:

means for placing said DMA tasks in a DMA task queue and said core tasks in a core task queue;

a CPU having means for generating at least one of said DMA tasks by one of said core tasks;

means for assigning a priority for each of said DMA and core tasks wherein said at least one DMA task is assigned a priority that corresponds to a priority of said one core task that generated it; and means for executing said tasks in an order that a task of a highest priority gets executed during any given cycle irrespective of whether such task is a DMA task or a core task.

21. The computer system of claim 20 wherein said CPU comprises means for generating a DMA task by a core task.

22. The computer system of claim 21 wherein said generated DMA task is assigned a priority that corresponds to said core task that generated said DMA task.

23. The computer system of claim 20 wherein priorities assigned to said DMA tasks are offset by a predetermined amount from priorities assigned to said core tasks.

24. The computer system of claim 23 wherein said priorities assigned to said core tasks are in integers.

25. The computer system of claim 24 wherein said predetermined amount is a value between 0–0.5.

26. The computer system of claim 20 further comprising means for preempting a task that is currently executing.

* * * * *